United States Patent

Schoendorff

[15] 3,644,813
[45] Feb. 22, 1972

[54] PROPORTIONAL CONTROL DIGITAL SPEED CONTROL SYSTEM

[72] Inventor: Arthur J. Schoendorff, Flint, Mich.
[73] Assignee: General Motors Corporation, Detroit, Mich.
[22] Filed: June 22, 1970
[21] Appl. No.: 48,073

[52] U.S. Cl............................................318/318, 318/569
[51] Int. Cl.......................................H02p 5/06, G05b 19/26
[58] Field of Search................318/314, 318, 329, 569, 600, 318/601, 603

[56] References Cited

UNITED STATES PATENTS 3,218,532  11/1965  Toscano.............................318/569 X
3,172,026  3/1965   Schuman...........................318/569 X Primary Examiner—J. D. Miller
Assistant Examiner—Robert J. Hickey
Attorney—Jean L. Carpenter and Paul Fitzpatrick

[57] ABSTRACT

A proportional control digital speed control system for a controlled apparatus having an input logic circuit which supplies a number of pulses to a memory register to generate and store therein a binary number representing a desired speed of the controlled apparatus. The input logic circuit supplies a clock pulse and a series of pulses having a frequency corresponding to the speed of the controlled apparatus to a suppressor such that the number of pulses which occur during the clock pulse represents the actual speed of the controlled apparatus. The suppressor suppresses a predetermined number of the pulses occurring at the beginning of the clock pulse and supplies the remaining number of pulses which occur during the clock pulse to a tracking register to generate therein a binary number which is equal to the number which represents the actual speed of the controlled apparatus less the number of pulses suppressed by the suppressor. When the speed of the controlled apparatus is within a predetermined magnitude, an in-zone error indicator, in conjunction with the tracking register and a comparator which compares the binary numbers within the memory register and the tracking register, determines the magnitude of the speed error. A proportional control signal generator is responsive to the in-zone error indicator to supply a signal having a duty cycle corresponding to the speed error determined. An output logic circuit in conjunction with the input logic circuit, the comparator, and the proportional control signal generator controls a speed actuator to provide for maximum acceleration or maximum deceleration when the magnitude of the error in the speed of the controlled apparatus exceeds the predetermined magnitude and to provide for varying degrees of acceleration or deceleration when the magnitude of the error in the speed of the controlled apparatus is within the predetermined magnitude.

5 Claims, 5 Drawing Figures

INVENTOR.
Arthur J. Schoendorff
BY
Paul Fitzpatrick
ATTORNEY 3,644,813

PROPORTIONAL CONTROL DIGITAL SPEED CONTROL SYSTEM

This invention relates to a proportional control digital speed control system, and, more specifically, to a proportional control digital speed control system for determining the magnitude of the error in the speed of a controlled apparatus when the error is within a predetermined magnitude and controlling the speed of the controlled apparatus in a manner proportional to the error in the speed detected so as to maintain a desired speed.

Speed control systems presently used are usually comprised of either a mechanical servomechanism which is operative by feedback control or an electrical analog system whereby an analog signal which represents the desired speed is generated to be compared with another generated analog signal which represents the actual speed.

This invention is directed toward a proportional control digital speed control system in which a number representing the actual speed of a controlled apparatus less a predetermined magnitude (which magnitude is determined by the maximum magnitude of speed error within which proportional control is desired) is periodically compared with a number which represents the desired speed of the controlled apparatus. The difference which is detected is utilized to determine the magnitude of the error in the speed of the controlled apparatus. This speed error is then utilized to control the speed of the controlled apparatus so as to maintain a desired speed.

The general object of this invention is to provide for a proportional control digital speed control system.

It is another object of this invention to provide for a proportional control digital speed control system in which the magnitude of the error in the speed of the controlled apparatus is determined when the speed error is within a predetermined magnitude by introducing a known speed error in the comparison of the desired speed and the actual speed.

These and other objects of this invention are accomplished by generating a series of pulses having a frequency corresponding to the speed of the controlled apparatus and utilizing these pulses to step digital registers. When the controlled apparatus is at the desired speed, the series of pulses is supplied to a memory register for a specified duration of time so as to step the memory register and generate therein a binary number representing the frequency of the series of pulses and therefore the desired speed of the controlled apparatus. The output of the memory register is a binary representation of the number of pulses supplied thereto. Thereafter, the binary number representing the desired speed is stored in the memory register and will remain fixed regardless of future changes in the actual speed of the controlled apparatus. The series of speed responsive pulses is then supplied to a suppressor for the same duration of time. The suppressor suppresses a predetermined number of pulses and supplies the remaining number of pulses to a tracking register so as to generate therein a binary number equal to the number of the pulses supplied during the specified duration of time less the number of pulses suppressed by the suppressor. The number of pulses suppressed is one greater than the number of pulses which represents the maximum magnitude of speed error within which proportional control is desired. The binary number generated within the tracking register represents the actual speed of the controlled apparatus less the speed offset represented by the number of pulses suppressed. When the magnitude of the speed error of the controlled apparatus is less than the speed error which is represented by the number of pulses suppressed, the actual error is determined by supplying pulses to the tracking register and counting the number of pulses supplied thereto until the binary number contained within the tracking register equals the binary number contained within the memory register. The number of pulses required to accomplish this equality represents the error in the speed of the controlled apparatus. The information detected during and after the foregoing operations are utilized to control the speed of the controlled apparatus in a manner so as to maintain the desired speed.

In the preferred embodiment as hereinafter discussed, the proportional control digital speed control system is illustrated with reference to a vehicle having a throttle-controlled internal combustion engine. It is understood that the digital speed control system is not limited thereto, but may be utilized to control the speed of any controlled apparatus which may be, for example, an electric motor. In addition, the digital elements such as digital counters, inverters, flip-flops, and logic elements are standard and may be found, for example, in the 1969 *Digital Control Handbook* of the Digital Equipment Corporation. Clocks, time delays and speed sensors are well known in the art and therefore, specific designs of such devices are not shown.

Also, in the following description, a "1" bit is equivalent to a positive DC voltage level while a "0" bit is equivalent to a zero or ground level.

The logic elements utilized include AND gates, OR gates, EXCLUSIVE OR gates and inverters. The function of the AND gate is to supply "1" bit at its output when all its inputs are "1" bits, the function of the OR gate is to supply a "1" bit at its output when any of its inputs is a "1" bit, the function of the EXCLUSIVE OR gate is to supply a "1" bit at its output when one but not both of its inputs is a "1" bit and the function of an inverter is to supply a "1" bit or "0" bit at its output when its input is a "0" bit or "1" bit respectively.

The invention may be best understood by reference to the following detailed description of a preferred embodiment and the accompanying drawings in which.

Figure 1:
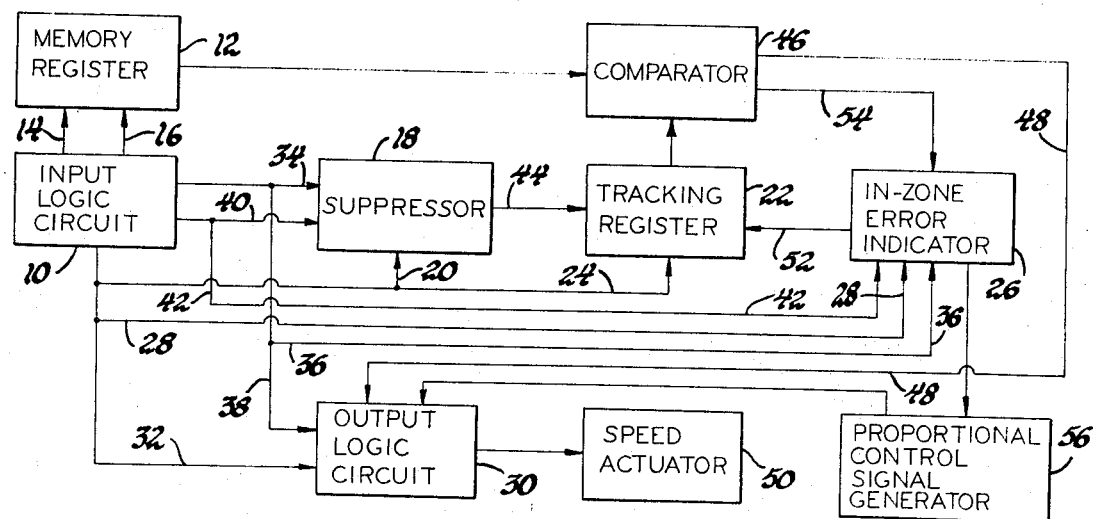
FIG. 1 is a block diagram of the preferred embodiment of this invention.

Referring to FIG. 1, when it is desired to automatically control the speed of the vehicle, the vehicle is manually driven to the desired speed. At the desired speed, an input circuit 10 is caused to supply a series of pulses having a frequency corresponding to the speed of the vehicle to a memory register 12 through a line 14. This series of pulses is supplied to the memory register 12 for a specified duration of time so that the total number of pulses supplied represents the frequency of the series of pulses and therefore the desired speed of the vehicle. The memory register 12 is a digital register which counts the number of pulses supplied from the input logic circuit 10 in binary form and stores that number until such time as a clearing pulse is supplied from the input logic circuit 10 through a line 16.

To determine a change in the speed of the vehicle, a number which is related to the actual speed of the vehicle is periodically compared with the number which represents the desired speed of the vehicle, which number is stored in binary form within the memory register 12. First, a clearing pulse is supplied from the input logic circuit 10 to a suppressor 18 through a line 20, a tracking register 22 through a line 24, an in-zone error indicator 26 through a line 28, and to an output logic circuit 30 through a line 32. The input logic circuit 10 then supplies a clock pulse to the suppressor 18 through a line 34, to the in-zone error indicator 26 through the line 36 and to the output logic circuit 30 through the line 38. The time duration of the clock pulse is equal to the time duration that the series of pulses was supplied to the memory register 12. In addition, the input logic circuit 10 constantly supplies the series of pulses having a frequency corresponding to the speed of the vehicle to the suppressor 18 through a line 40 and to an in-zone error indicator 26 through a line 42.

At the start of the clock pulse supplied through the line 34, the suppressor 18 suppresses a predetermined number of pulses and supplies the remaining number of pulses which occur during the time period of the clock pulse to the tracking register 22 through the line 44. The tracking register 22 is a digital register which counts the number of pulses supplied thereto in binary form. As can be seen, the sum of the number of pulses suppressed by the suppressor 18 and the binary number generated within the tracking register 22 represents the frequency of the series of pulses supplied by the input logic circuit 10 and therefore the actual speed of the vehicle. The number of pulses suppressed by the suppressor 18 is one greater than the number of pulses which represents the maximum magnitude of speed error within which proportional control is desired. If the vehicle speed error is greater than the maximum magnitude, the vehicle speed will hereinafter be referred to as out-of-zone and may be overspeed or underspeed. If the vehicle speed error is equal to or less than that maximum magnitude, the vehicle speed will hereinafter be referred to as in-zone and may be overspeed or underspeed.

If the binary number generated within the tracking register 22 during the clock pulse supplied to the suppressor 18 through the line 40 equals the binary number within memory register 12 as determined by a comparator 46, the vehicle speed is at least greater than the desired speed by the number of pulses suppressed by the suppressor 18 and is therefore overspeed and out-of-zone. When this condition exists, the output logic circuit 30 receives a signal during the clock pulse from the comparator 46 through a line 48 when the binary number with the tracking register 22 is equal to the binary number within the memory register 12 and supplies a signal to a speed actuator 50 to provide for maximum deceleration.

If, at the end of the clock pulse supplied to the suppressor 18 through the line 40, the binary number generated within the tracking register 22 does not equal the binary number stored within the memory register 12, the in-zone indicator 26 supplies pulses to the tracking register 22 through a line 52 to step the tracking register and add to the binary number therein a number equal to the number of pulses supplied. The maximum number of pulses supplied by the in-zone error indicator 26 is equal to the number of pulses which represent the total range of in-zone speed error, or twice the number of pulses suppressed by the suppressor 18 less one. If the vehicle speed is in-zone, the in-zone error indicator 26 counts the number of pulses which are supplied to the tracking register 22 through the line 52 until the comparator 46 detects that the binary number within the tracking register 22 equals the binary number within the memory register 12 and supplies a signal to the in-zone error indicator 26 through a line 54. The number of pulses counted represents the magnitude of the in-zone speed error. A proportional control signal generator 56 supplies a duty-cycle signal to the output logic circuit 30 which supplies a signal to the speed actuator to provide for varying degrees of acceleration or deceleration which correspond to the magnitude of the in-zone error. If the binary number within the tracking register 22 does not equal the binary number stored within the memory register 12 after the tracking register has been stepped by the maximum number of pulses supplied through the line 52 by the in-zone error indicator 26, the output logic circuit 30 detects an underspeed and out-of-zone error and supplies a signal to the speed actuator 50 to provide for maximum acceleration.

The input logic circuit 10 then supplies a clearing signal to the retarder 18 through the line 20, the tracking register 22 through the line 24, the in-zone error indicator 26 through the line 28 and the output logic circuit 30 through the line 32 to clear the information contained therein and to again initiate the cycle as previously described to determine a new error in the speed of the vehicle and to control the vehicle speed correspondingly.

A description of the input logic circuit 10 will be given with reference to FIG. 2. The output of a clock 58 is supplied to the input of an inverter 60 and a time delay circuit 62 having a delay time $Y_1$. The output of the inverter 60 is connected to an input of an OR-gate 64. The output of the time delay circuit 62 is supplied to the input of an inverter 66, the input of a time delay circuit 68 having a delay time $Y_2$, an input of the OR-gate 64, the suppressor 18 through the line 34, the in-zone error indicator 26 through the line 36, and to the output logic circuit 30 through the line 38. The output of the OR-gate 64 is supplied to the suppressor 18 through the line 20, the in-zone error indicator 26 through the line 28, the output logic circuit 30 through the line 32, and the tracking register 22 through the line 24. The output of the inverter 66 and the time delay circuit 68 are each supplied respectively to an input of an AND-gate 70 whose output is connected to the input of an inverter 72. The output of the inverter 72 is supplied to an input of an OR-gate 74 whose output is supplied to the reset inputs of the flip-flops 76 and 78 respectively. The output of the inverter 66 is also supplied to the trigger input of the flip-flop 78.

A manually operable switch 80 engages a grounded stationary contact 82 and an open circuited stationary contact 84 when in the position shown and engages the stationary contact 82 and a stationary contact 86 when in the broken line position 88. The contact 86 is connected to the input of an inverter 90 and to the memory register 12 by the line 16. The output of the inverter 90 is supplied to the trigger input of the flip-flop 76 whose 1 output is connected to the data input of the flip-flop 78. The 1 output of the flip-flop 78 is connected to an input of an AND-gate 92 and the 0 output is connected to an input of the OR-gate 74. The output of the AND-gate 92 is supplied to the memory register 12 through the line 14. The output of a speed sensor 94 is supplied to an input of the AND-gate 92, the suppressor 18 through the line 40, and the in-zone error indicator 26 through the line 42. The speed sensor 94 may be, for example, a reed switch operated by a rotating magnet to generate a series of pulses having a frequency corresponding to the speed of the vehicle. Such a speed pickup is well known and therefore will not be described in greater detail.

The flip-flops 76 and 78 are of the type in which the input to the data input is transferred to the 1 output when the input to the trigger input changes from a "1" bit to a "0" bit. The flip-flops 76 and 78, when reset, supply "0" bits at their 1 outputs and "1" bits at their 0 outputs. As can be seen, if the 0 output of the flip-flop 78 is a "0" bit, the flip-flops 76 and 78 will be reset by the output of the OR-gate 74 upon the occurrence of "0" bit pulse at the output of the inverter 72. Thereafter, the output of the OR-gate 74 remains a "1" bit since the input to the OR-gate 74 from the 0 output of the flip-flop 78 is a "0" bit.

The input to the inverter 90 and the memory register 12 through the line 16 is a "1" bit unless the contact 86 is grounded through the switch 80 and the contact 82. Also, the data input of the flip-flop will always be a "1" bit.

Figure 2:
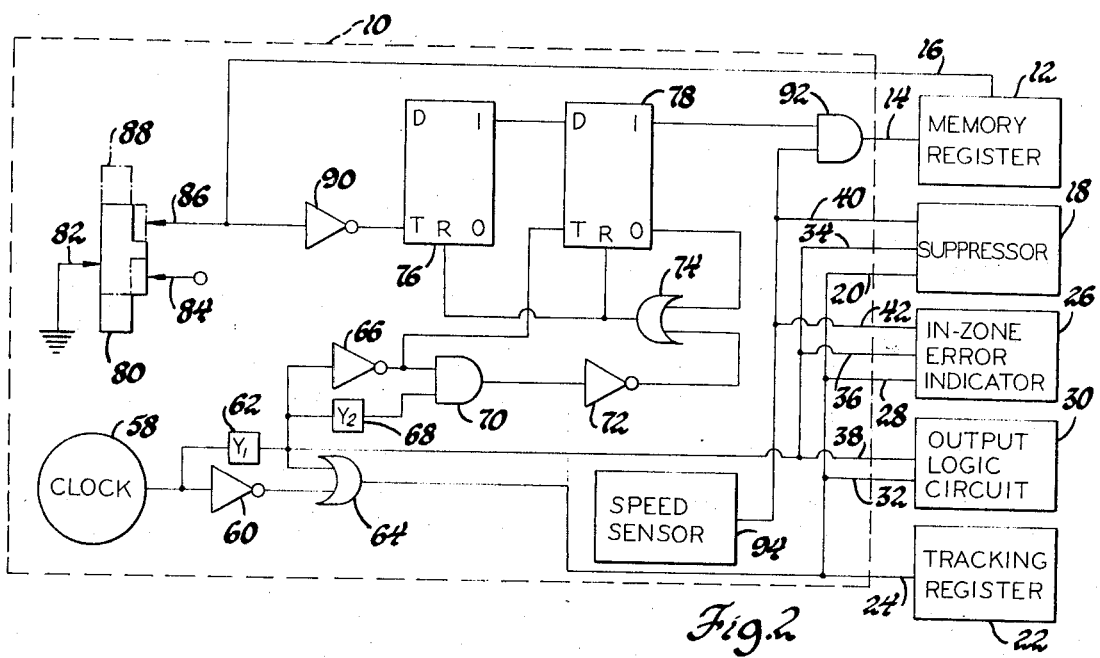
FIG. 2 is a schematic diagram of the input logic circuit of FIG. 1.
Figure 3:
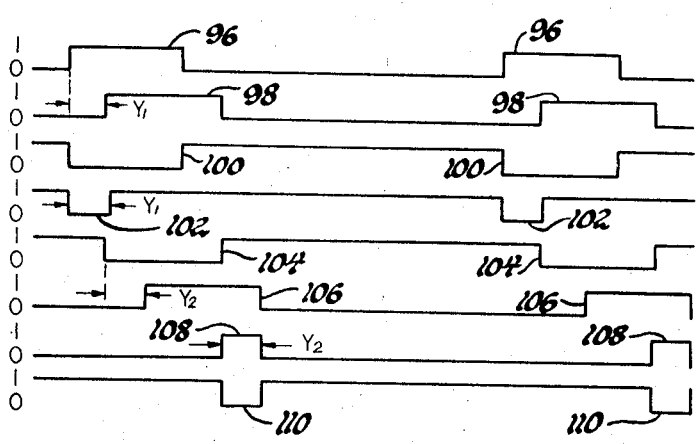
FIG. 3 is a graph of various outputs of the input logic circuit of FIG. 2.

Referring to FIGS. 2 and 3, the output of the clock 58 is a series of "1" bit pulses 96. The output of the time delay circuit 62 is a series of "1" bit pulses 98 having a time duration equal to the "1" bit pulses 96 whose leading edges occur at a time $Y_1$ after the leading edges of the "1" bit pulses 96. The output of the inverter 60 is a series of "0" bit pulses 100 having a time duration equal to the "1" bit pulses 96 and occurring simultaneously therewith. The output of the OR-gate 64 is a series of "0" bit pulses 102 having a time duration $Y_1$ and whose trailing edges occur simultaneously with the leading edges of the "1" bit pulses 98. The output of the inverter 66 is a series of "0" bit pulses 104 having a time duration equal to the "1" bit pulses 98 and occurring simultaneously therewith. The output of the time delay circuit 68 is a series of "1" bit pulses 106 having a time duration equal to the "0" bit pulses 104 and whose leading edges occur at a time $Y_2$ after the leading edges of the "0" bit pulses 104. The output of the AND-gate 70 is a series of "1" bit pulses 108 having a time duration $Y_2$ and whose leading edges occur simultaneously with the trailing edges of the "0" bit pulses 104. The output of the inverter 72 is a series of "0" bit pulses 110 whose leading edges occur simultaneously with the trailing edges of the "0" bit pulses 104.

When the switch 80 is in the position as shown, the input to the inverter 90 and the input to the memory register 12 through the line 16 are "1" bits. Therefore, the trigger input of the flip-flop 76 from the inverter 90 is a "0" bit. When the switch 80 is moved to the broken line position 88, the input to the memory register 12 through the line 16 changes to a "0" bit since the contact 86 is then grounded through the contact 82. This transition from a "1" bit to a "0" bit clears the memory register 12 so that the outputs of the binary stages therein are all "0" bits. When it is desired to control the speed of the vehicle, it is necessary to supply to the memory register 12 a number of pulses which represents the desired speed of the vehicle. To accomplish this, the vehicle operator manually drives the vehicle to the desired speed and positions the contact 80 in the position shown. The input to the inverter 90 changes from a "0" bit to a "1" bit to cause its output to change from a "1" bit to a "0" bit. This transition transfers the "1" bit input at the data lead of the flip-flop 76 to its 1 output. Upon the occurrence of the next leading edge of the "1" bit pulse 98 at the output of the time delay circuit 62, the "0" bit 104 at the output of the inverter 66 triggers the flip-flop 78 and transfers the "1" bit input on its data lead to its 1 output. This "1" bit will remain on the 1 output of the flip-flop 78 until the trailing edge of the "1" bit pulse 98 occurs at the output of the time delay circuit 62 at which time the leading edge of the "0" bit pulse 110 at the output of the inverter 72 causes the output of the OR-gate 74 to change from a "1" bit to a "0" bit since the 0 output of the flip-flop 78 is then a "0" bit. This transition from a "1" bit to a "0" bit resets the flip-flops 76 and 78 to cause the respective 1 outputs to change to "0" bits. As can be seen, the "1" bit on the 1 output of the flip-flop 78 has a time duration equal to the time duration of the "1" bit pulse 98 at the output of the time delay circuit 62. During this time duration, the output of the speed sensor 94, which is a series of pulses having a frequency corresponding to the speed of the vehicle, periodically enables the AND-gate 92 to supply a series of pulses corresponding to the output of the speed sensor 94 to the memory register 12 through the line 14. The total number of "1" bit pulses supplied to the memory register 12 through the line 14 represents the desired speed of the vehicle. These pulses step the memory register 12 so as to generate therein a binary number which represents the desired speed of the vehicle. As can be seen, the AND-gate 92 cannot be enabled again to supply pulses to the memory register 12 until such time that the switch 80 is placed in the broken line position 88 to clear the memory register 12 through the line 16 and again placed in the position shown. Therefore, for the time duration that the switch 80 remains in the position shown, the memory register 12 stores the binary number generated therein.

Figure 4:
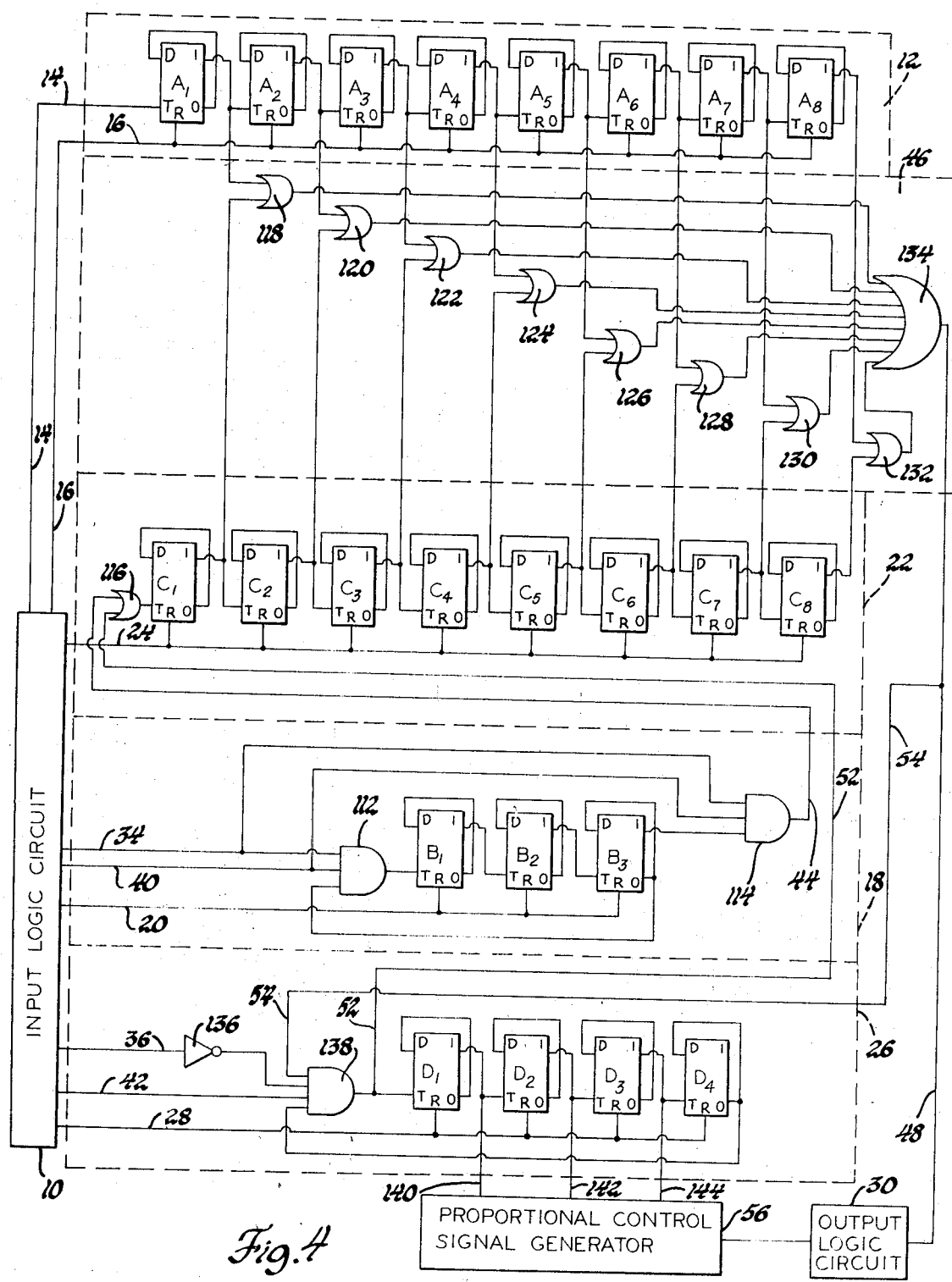
FIG. 4 is a schematic diagram of the memory register, the tracking register, the comparator, the suppressor and the in-zone error indicator of FIG. 1.

Referring to FIG. 4, the memory register 12 is comprised of the flip-flops $A_1$ through $A_8$ connected as shown to form a digital counter whereby the flip-flops $A_1$ through $A_8$ range from low to higher order, respectively. The flip-flops $A_1$ through $A_8$ supply outputs in the form of "1" bits or "0" bits at their respective outputs. The line 14 from the input logic circuit 10 is connected to the trigger input of the lowest ordered flip-flop $A_1$ and the line 16 from the input logic circuit 10 is connected to the reset inputs of the flip-flops $A_1$ through $A_8$, respectively. When the input through the line 16 changes from a "1" bit to a "0" bit, the flip-flops $A_1$ through $A_8$ are cleared and their 1 outputs are all set to "0" bits. A series of pulses appearing at the trigger input of the flip-flop $A_1$ through the line 14 are counted in binary form by the memory register 12 with net count appearing as "1" bits and "0" bits at the 1 outputs of the flip-flops $A_1$ through $A_8$.

The suppressor 18 is comprised of the AND-gates 112 and 114 and the flip-flops $B_1$ through $B_3$ connected as shown in the form of a digital binary counter with the flip-flops $B_1$ through $B_3$ ranging from low to higher order respectively. The line 34 which supplies the "1" bit pulse 98 from the input logic circuit 10 is connected to an input of the AND-gate 112 and to an input of the AND-gate 114. The line 40 which supplies the series of pulses having a frequency corresponding to the speed of the vehicle from the input logic circuit 10 is connected to an input of the AND-gate 112 and to an input of the AND-gate 114. The line 20 which supplies the "0" bit pulse 102 from the input logic circuit 10 is connected to the reset inputs of the flip-flops $B_1$ through $B_3$. The 1 output of the flip-flop $B_3$ is connected to an input of the AND-gate 114 and its 0 output is connected to an input of the AND-gate 112. The output of the AND-gate 112 is connected to the trigger input of the flip-flop $B_1$. The output of the AND-gate 114 is supplied to the tracking register 22 through the line 44. The flip-flops $B_1$ through $B_3$ will count in binary form the pulses which appear at the output of the AND-gate 112. When the input through the line 20 changes from a "1" bit to the "0" bit, the flip-flops $B_1$ through $B_3$ are cleared and their 1 outputs are all set to "0" bits.

The tracking register 22 is comprised of the flip-flops $C_1$ through $C_8$ connected as shown to form a digital binary counter whereby the flip-flops $C_1$ through $C_8$ range from low to high order, respectively, and an OR-gate 116 whose output is connected to the trigger input of the flip-flop $C_1$. The line 24 which supplies the "0" bit pulse 102 from the input logic circuit 10 is connected to the reset inputs of the flip-flops $C_1$ through $C_8$ respectively. When the input through the line 24 changes from a "1" bit to a "0" bit, the 1 outputs of the flip-flops $C_1$ through $C_8$ are all set to "0" bits. The flip-flops $C_1$ through $C_8$ count in binary form the pulses which appear at the output of the OR-gate 116 with the net count appearing as "1" bits and "0" bits at their 1 outputs. The OR-gate 116 receives an input from the suppressor 18 through the line 44 and an input from the in-zone error indicator 26 through the line 52.

The comparator 46 is comprised of the EXCLUSIVE OR gates 118, 120, 122, 124, 126, 128, 130 and 132 and an OR-gate 134. The 1 outputs of each pair of equal ordered flip-flops $A_1$-$C_1$ through $A_8$-$C_8$ are connected respectively to inputs of an EXCLUSIVE OR gate 118 through 132. The outputs of the EXCLUSIVE OR gates 118 through 132 are connected to inputs of the OR gate 134. The output of each EXCLUSIVE OR gate 118 through 132 will be a "1" bit when one but not both of its inputs is a "1" bit and will be a "0" bit when the inputs are both the same. Therefore, as can be seen, the output of the OR-gate 134 will be a "1" bit when the binary number represented by the output of the flip-flops $A_1$ through $A_8$ is not equal to the binary number as represented by the outputs of the flip-flops $C_1$ through $C_8$. Conversely, the output of the OR gate 134 will be a "0" bit when the binary number represented by the outputs of the flip-flops $A_1$ through $A_8$ equals the binary number represented by the output of the flip-flops $C_1$ through $C_8$. The output of the OR-gate 134 is supplied to the in-zone error indicator 26 through the line 54 and to the output logic circuit 30 through the line 48.

The in-zone error indicator 26 is comprised of an inverter 136, an AND-gate 138, and the flip-flops $D_1$ through $D_4$ connected as shown in the form of a digital binary counter whereby the flip-flops $D_1$ through $D_4$ range from low to high order, respectively. The inverter 136 receives an input from the input logic circuit 10 through the line 36 and supplies an output to an input of the AND-gate 138. In addition, the AND-gate 138 receives an input from the comparator 46 through the line 54, an input from the input logic circuit 10 through the line 42, and an input from the 0 output of the flip-flop $D_4$. The output of the AND-gate 138 is connected to the trigger input of the flip-flop $D_1$ and to the tracking register 22 through the line 52. The flip-flops $D_1$ through $D_4$ count in binary form pulses supplied by the AND-gate 138. The line 28 from the input logic circuit 10 is connected to the reset inputs of the flip-flops $D_1$ through $D_4$. When the input through the line 28 changes from a "1" bit to a "0" bit the 1 outputs of the flip-flops $D_1$ through $D_4$ are all changed to "0" bits. The 1 output of the flip-flop $D_1$ is supplied to the proportional control signal generator 56 through a line 140, the 1 output of the flip-flop $D_2$ is connected to the proportional control signal generator 56 through a line 142, and the 1 output of the flip-flop $D_3$ is supplied to the proportional control signal generator 56 through a line 144.

When it is desired to control the speed of the vehicle, the memory register 12 is cleared ad previously described by changing the input through the line 16 from a "1" bit to a "0" bit. Thereafter, a number of "1" bit pulses are supplied through the line 14 to step the memory register 12 and generate therein a binary number in the form of "1" and "0" bits on the 1 outputs of the flip-flops $A_1$ through $A_8$ which represents the desired speed of the vehicle. In order to control the speed of the vehicle, that desired speed must be compared with the actual speed of the vehicle and the speed controlled corresponding to the speed error determined. In addition, in order to control the speed of the vehicle in a proportional manner when the speed of the vehicle is within a prescribed error, the magnitude of the error within that prescribed error must be determined and a proportional control signal generated corresponding to that error determined.

For purposes of illustration, it will be assumed that it is desired to control the vehicle speed in a manner proportional to the speed error when the difference between the number which represents the actual speed of the vehicle is within three counts of the desired speed as represented by the binary number generated within the memory register 12. Therefore, the suppressor 18 must suppress the first four pulses supplied thereto by the input logic circuit 10 which occur during the "1" bit pulse 98 and the in-zone error indicator 26 must have the capability of supplying to the tracking register 22 a maximum of seven pulses, which numbers are determined as previously described.

The sequence of events which occur when the vehicle speed is being controlled will be described beginning just prior to the leading edge of the "1" bit pulse 96 at the output of the clock 58 in FIG. 2. In addition, it will be assumed that the operator has positioned the switch 80 into the position shown to generate within the memory register 12 a binary number which represents the desired speed of the vehicle.

Upon the occurrence of the "1" bit pulse 96, the "0" bit pulse 102 is supplied to the tracking register 22 through the line 24, the suppressor 18 through the line 20, and the in-zone error indicator 26 through the line 28. The flip-flops $C_1$ through $C_8$ in the tracking register 22, $B_1$ through $B_3$ in the suppressor 18, and $D_1$ through $D_4$ in the in-zone error indicator 26 are reset such that their 1 outputs are all "0" bits. The input logic circuit 10 then supplies the "1" bit pulse 98 to the suppressor 18 through the line 34 and the in-zone error indicator 26 through the line 36. In addition, the input logic circuit 10 continuously supplies the series of pulses from the speed sensor 94, which have a frequency corresponding to the speed of the vehicle, to the suppressor 18 through the line 40 and the in-zone error indicator through the line 42. Upon the occurrence of the "1" bit pulse 98 through the line 34, the AND-gate 112 is periodically enabled by the pulses supplied through the line 40 since the 0 output of the flip-flop $B_3$ was previously set to a "1" bit by the "0" bit pulse 102 through the line 20. The flip-flops $B_1$ through $B_3$ count the pulses at the output of the AND-gate 112 in binary fashion. Following the fourth pulse supplied to the trigger input of the flip-flop $B_1$, the 1 output of the flip-flop $B_3$ shifts to a "1" bit and the 0 output shifts to a "0" bit. The AND-gate 112 is therefore prevented from supplying further pulses to the flip-flop $B_1$. When the 1 output of the flip-flop $B_3$ shifts to a "1" bit, the AND-gate 114 is periodically enabled by the "1" bit, pulses through the line 40 for the remaining portion of the "1" bit pulse 98 through the line 34 after which the AND-gate 114 is prevented from supplying a further number of pulses. Since the time duration of the "1" bit pulse 98 is equal to the time duration that the series of "1" bit pulses was supplied to the memory register 12 through the line 14, it can be seen that the number of pulses counted by the flip-flops $B_1$ through $B_3$ in the suppressor 18 and the number of pulses supplied to the tracking register 22 through the line 44 represents the frequency of the pulses supplied through the line 40 from the input logic circuit 10 and, therefore, the actual speed of the vehicle.

The pulses supplied to the tracking register 22 through the line 44 periodically enable the OR-gate 116 to supply pulses to the trigger input of the flip-flop $C_1$ in the tracking register 22 and generate therein a binary number which represents the number of pulses supplied thereto through the line 44.

The vehicle speed may take one of three forms. They are underspeed out-of-zone, in-zone and overspeed out-of-zone. If the vehicle speed is underspeed out-of-zone, the binary number generated within the tracking register 22 during the "1" bit pulse 98 is at least eight less than the binary number stored within the memory register 12. Therefore, the output of the OR-gate 134 in the comparator 46 is always a "1" bit during the "1" bit pulse 98. Upon the occurrence of the trailing edge of the "1" bit pulse 98 supplied to the in-zone error indicator 26 through the line 36, the output of the inverter 136 shifts to a "1" bit which is supplied to the AND-gate 138. The remaining inputs to the AND-gate 138 are a "1" bit supplied by the comparator 46 through the line 54, a "1" bit supplied by the 0 output of the flip-flop $D_4$, which was previously reset by the "0" bit pulse 102 and the series of pulses supplied by the input circuit 10 through the line 42. The AND-gate 138 is therefore periodically enabled by the pulses supplied through the line 42 to supply a series of pulses to the trigger input of the flip-flop $D_1$ and to the OR-gate 116 in the tracking register 22 through the line 52. The pulses supplied by the AND-gate 138 step the flip-flops $D_1$ through $D_4$ which were previously reset by the "0" bit pulse 102 supplied through the line 28 and the flip-flops $C_1$ through $C_8$ until after the occurrence of the eighth pulse at the output of the AND-gate 138. After the occurrence of the eighth pulse, the 0 output of the flip-flop $D_4$ is a "0" bit which prevents the AND-gate 138 from supplying a further number of pulses. When this occurs, the 1 output of the flip-flop $D_1$ through the line 140 is a "0" bit, the 1 output of the flip-flop $D_2$ through the line 142 is a "0" bit and the 1 output of the flip-flop $D_3$ through the line 144 is a "0" bit.

If the speed of the vehicle is in zone, the binary number generated within the tracking register during the "1" bit pulse 98 is at the most seven less than the number stored within the memory register 12. Therefore, the output of the OR-gate 134 in the comparator 46 is always a "1" bit during the "1" bit pulse 98. The "1" bit output of the OR-gate 134 is supplied to the in-zone error indicator 26 through the line 54 and to the output logic circuit 30 through the line 48. As previously described with reference to the vehicle speed being underspeed out-of-zone, the flip-flops $D_1$ through $D_4$ and the flip-flops $C_1$ through $C_8$ in the tracking register 22 are periodically stepped by pulses supplied by the AND-gate 138 to add to the number therein a number equal to the number of the pulses supplied. Since the binary number within the tracking register 22 at the end of the "1" bit pulse 98 is at the most seven less than the binary number stored within the memory register 12 when the vehicle speed is in-zone, the binary number within the tracking register 22 will become equal to the binary number stored within the memory register 12 within the first seven pulses supplied by the AND-gate 138. At this time, the output of the OR-gate 134 in the comparator 46 shifts from a "1" bit to a "0" bit which is supplied to the AND-gate 138 in the in-zone error indicator 26 through the line 54 to prevent the AND-gate 138 from supplying a further number of pulses. If the vehicle speed error is in-zone and three counts overspeed, the flip-flops $D_1$ through $D_4$ will have counted a total of one pulse as indicated by a "1" bit supplied to the proportional control signal generator 56 through the line 140 and the "0" bits supplied to the proportional control signal generator 56 through the lines 142 and 144. If the vehicle speed error is in-zone and two counts overspeed, the in-zone error indicator 26 will have counted a total of two pulses as indicated by the "1" bit supplied to the proportional control signal generator 56 through the line 142 and the "0" bits supplied to the proportional control signal generator 56 through the lines 140 and 144. If the vehicle speed error is in-zone and one count overspeed, the in-zone error indicator 26 will have counted a total of three pulses as indicated by the "1" bits supplied to the proportional control signal generator 56 through the lines 140 and 142 and a "0" bit supplied to the proportional control signal generator 56 through the line 144. If the vehicle speed is equal to the desired speed, the in-zone error indicator 26 will have counted a total of four pulses as indicated by a "1" bit supplied to the proportional control signal generator 56 through the line 144 and the "0" bits supplied to the proportional control signal generator 56 through the lines 140 and 142. If the vehicle speed error is in-zone and one count underspeed, the in-zone error indicator 26 will have counted a total of five pulses as indicated by the "1" bits supplied to the proportional control signal generator 56 through the lines 140 and 144 and a "0" bit supplied to the proportional control signal generator 56 through the line 142. If the vehicle speed error is in-zone and two counts underspeed, the in-zone error indicator 26 will have counted a total of six pulses as indicated by the "1" bits supplied to the proportional control signal generator 56 through the lines 142 and 144 and a "0" bit supplied to the proportional control signal generator 56 through the line 140. When the speed error is in-zone and three counts overspeed, the in-zone error indicator 26 will have counted a total of seven pulses as indicated by the "1" bits supplied to the proportional control signal generator 56 through the lines 140, 142 and 144.

If the vehicle speed is overspeed out-of-zone, the binary number generated within the tracking register 22 becomes equal to the binary number stored within the memory register 12 during the "1" bit pulse 98. Therefore, the output of the OR-gate 134 in the comparator 46 shifts from a "1" bit to a "0" bit during the "1" bit pulse 98, which "0" bit is supplied to the output logic circuit 30 through the line 48.

Figure 5:
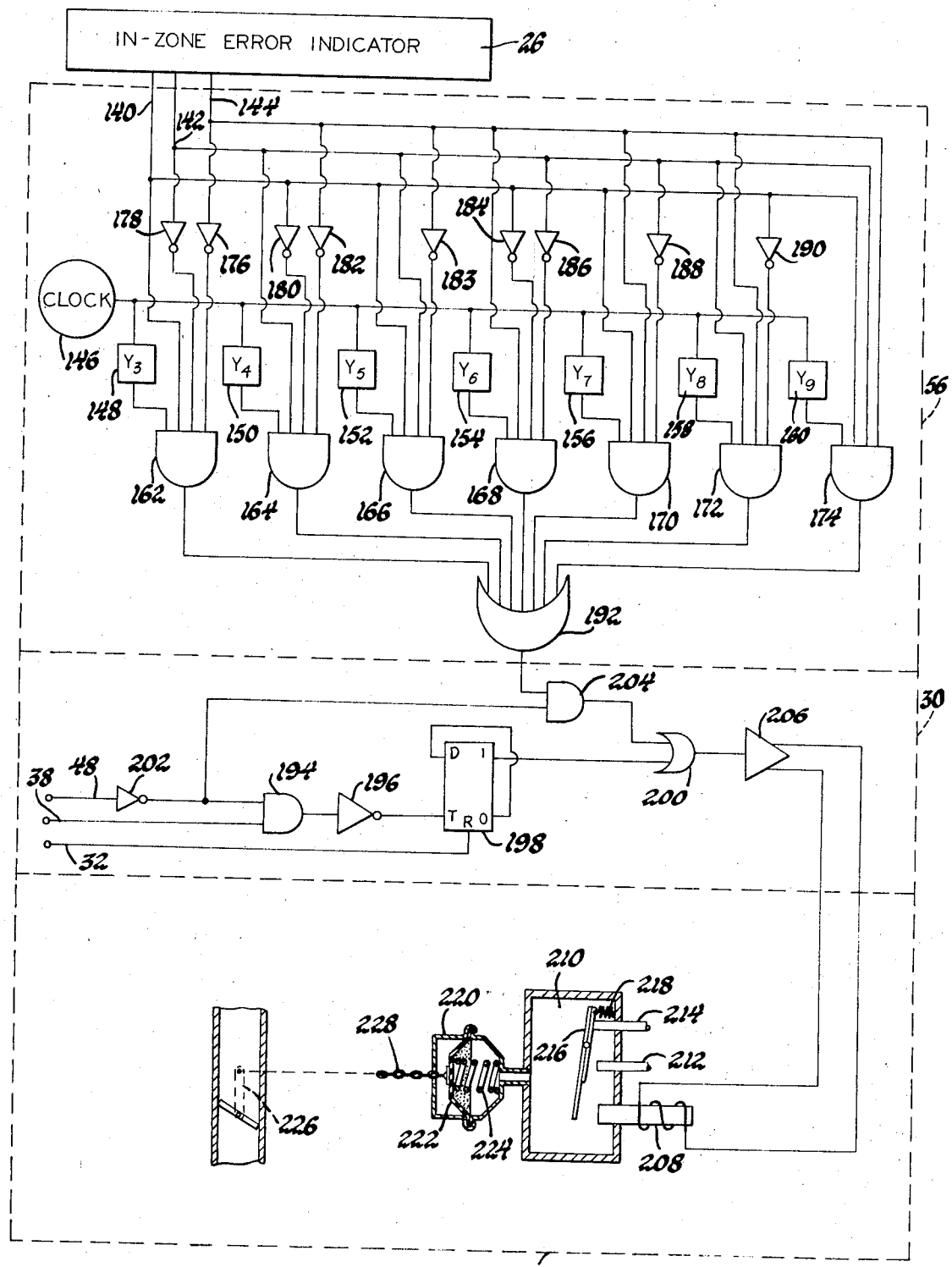
FIG. 5 is a schematic diagram of the proportional control signal generator, the output logic circuit, and the speed actuator of FIG. 1.

Referring to FIG. 5, the proportional control signal generator 56 takes the form of the signal generator which is the subject matter of Ser. No. 885,753 entitled Variable Duty Cycle Control Generator, filed by the inventor of the present invention on Dec. 17, 1969, and assigned to the assignee of the present invention, the specification of which is hereby incorporated by reference. Briefly, the proportional control signal generator 56 is comprised of a clock 146 which supplies a rectangular waveform to a series of leading edge time delay circuits 148, 150, 152, 154, 156, 158 and 160 having delay times $Y_3$, $Y_4$, $Y_5$, $Y_6$, $Y_7$ and $Y_9$, respectively. The outputs of the leading edge time delay circuits 148 through 160 are rectangular waveforms having a duty cycle determined by the respective delay times $Y_3$ through $Y_9$, respectively. The output of each time delay circuit 148 through 160 is supplied to an input of an AND-gate 162, 164, 166, 168, 170, 172 and 174, respectively. The AND-gate 162 also receives an input through the line 140, an input from an inverter 176 which receives an input through the line 144 and an input from an inverter 178 which receives an input through the line 142. The AND-gate 164 also receives an input through the line 142, an input from an inverter 180 which receives an input through the line 140 and an input from an inverter 182 which receives an input through the line 144. The AND-gate 166 also receives an input through the line 140, an input through the line 142, and an input from an inverter 183 which receives an input through the line 144. The AND-gate 168 also receives an input through the line 144, an input from an inverter 184 which receives an input through the line 140 and an input from an inverter 186 which receives an input through the line 142. The AND-gate 170 also receives an input through the line 140, an input through the line 144 and an input from an inverter 188 which receives an input through the line 142. The AND-gate 172 also receives an input through the line 142, an input through the line 144, and an input from an inverter 190 which receives an input through the line 140. The AND-gate 174 also receives an input through the line 140, an input through the line 142, and an input through the line 144. The outputs of each of the AND-gates 162 through 174 are connected, respectively, to an input of an OR-gate 192.

When the vehicle speed is in-zone and three counts overspeed, the AND-gate 162 is enabled to supply a duty cycle signal having a duty cycle corresponding to the output of the time delay circuit 148. When the vehicle speed error is in-zone and two counts overspeed, the AND-gate 164 is periodically enabled to supply a signal having a duty cycle corresponding to the output of the time delay circuit 150. When the vehicle speed error is in-zone and one count overspeed, the AND-gate 166 is periodically enabled to supply a signal having a duty cycle corresponding to the output of the time delay circuit 152. When the vehicle speed is equal to the desired speed, the AND-gate 168 is periodically enabled to supply a signal having a duty cycle corresponding to the output of the time delay circuit 154. When the vehicle speed error is in-zone and one count underspeed, the AND-gate 170 is periodically enabled to supply a signal having a duty cycle corresponding to the output of the time delay circuit 156. When the vehicle speed is in-zone and two counts underspeed, the AND-gate 172 is periodically enabled to supply a signal having a duty cycle corresponding to the output of the time delay circuit 158. When the vehicle speed error is in-zone and three counts underspeed, the AND-gate 174 is periodically enabled to supply a signal having a duty cycle corresponding to the output of the time delay circuit 160. Therefore, the delay times $Y_3$ through $Y_9$ are determined so as to correspond to a desired duty cycle signal corresponding to the vehicle in-zone speed error. As can be seen, the in-zone error as determined by the in-zone error indicator 26 of FIG. 4 enables the AND-gate 162, 164, 166, 168, 170, 172 or 174 which is associated with the desired duty cycle signal. The output of the AND-gates 162 through 174 are supplied to the OR-gate 192 whose output is a waveform comprised of a series of "1" bits and "0" bits having a desired duty cycle corresponding to the in-zone speed error.

The output logic circuit 30 is comprised of an AND-gate 194 whose output is connected to the input of an inverter 196. The output of the inverter 196 is connected to the trigger input of a flip-flop 198 whose 0 output is connected to its data input and whose 1 output is connected to an input of an OR-gate 200. The output logic circuit 30 is also comprised of an inverter 202 whose output is connected to an input of the AND-gate 194 and an input of an AND-gate 204 which also receives an input from the OR-gate 192 in the proportional control signal generator 56. The output of the AND-gate 204 is supplied to an input of the OR-gate 200 whose output is connected to a noninverting amplifier 206. The inverter 202 receives an input through the line 48 from the comparator 46 of FIG. 4 and the AND-gate 194 receives an input through the line 38 from the input logic circuit 10 of FIG. 2. The line 32 from the input logic circuit 10 of FIG. 2 is connected to the reset input of the flip-flop 198.

The speed actuator 50 is comprised of a solenoid 208 which receives a current from the amplifier 206 in the output logic circuit 30 when the output of the OR-gate 200 is a "1" bit. A mixing chamber 210 has a conduit 212 through which vacuum is admitted from a vacuum source which may be, for example, the vehicle manifold vacuum, and a conduit 214 through which atmospheric air is admitted. A valve member 216 is biased to a first position by a spring member 218 so as to close the atmospheric air inlet through the conduit 214 and admit vacuum through the vacuum conduit 212. Valve member 216 is moved against the bias of the spring 218 by the solenoid 208 when energized so as to close the vacuum inlet of the conduit 212 and open the atmospheric inlet of the conduit 214. The mixing chamber 210 is connected to a pneumatic motor 220 which is comprised of a diaphragm and a spring 224. The diaphragm 222 is connected to a vehicle throttle 226 by means of a link 228. As the pressure within the mixing chamber 210 decreases below atmospheric pressure due to the admission of vacuum through the vacuum conduit 212, the diaphragm 222 is moved against the force of the spring 224 so as to move the link 228 and the attached throttle 226 to an open position. The throttle 226 is a conventional vehicle internal combustion engine throttle biased toward the closed position.

When the vehicle speed is underspeed out-of-zone, the input to the proportional control signal generator 56 through the lines 140, 142 and 144 are all "0" bits. Therefore, none of the AND-gates 162 through 174 are enabled to supply an input to the OR-gate 192. As a result, the output of the OR-gate 192 is a "0" bit supplied to the AND-gate 204 whose output is therefore a "0" bit supplied to the OR-gate 200. In addition, the input to the inverter 202 through the line 48 is always a "1" bit whose output is a "0" bit. Therefore, the output of the AND-gate 194 is always a "0" bit supplied to the inverter 196 whose output is a "1" bit. The flip-flop 198 which was previously reset by the "0" bit pulse 102 supplied through the line 32 continues to supply a "0" bit to the OR-gate 200 from the 1 output. Therefore, the output of the OR-gate 200 is a continuous "0" bit supplied to the amplifier 206 which supplies no current to the speed actuator 50. When this condition exists, the solenoid 208 is continually deenergized to allow the valve member 216 to be positioned by the spring 218 to allow vacuum to be admitted to the mixing chamber 210 through the conduit 212. Therefore, the diaphragm 222 is moved against the force of the spring 224 to move the link 228 and the throttle 226 to provide for maximum acceleration.

When the vehicle speed is in-zone, the input to the inverter 202 through the line 48 is a "0" bit supplied by the OR-gate 134 in the comparator 46. The output of the inverter is therefore a "1" bit supplied to the AND-gate 204. The output of the OR-gate 192 in the proportional control signal generator 56 is a series of "1" bits and "0" bits having a duty cycle corresponding to the error as determined by the total number of pulses counted by the flip-flops $D_1$ through $D_4$ in the in-zone error indicator 26 of FIG. 4. The AND-gate 204 is therefore periodically enabled to supply a series of "1" bits and "0" bits to the OR-gate 200. When the vehicle speed is in-zone, the input to the inverter 202 through the line 48 will be a "1" bit during the "1" bit pulse 98 supplied through the line 38. Therefore, the outputs of the inverter 202 and the AND-gate 194 will always be a "0" bit during the "1" bit pulse 98 and the output of the inverter 196 will be a "1" bit. Therefore, the 1 output of the flip-flop 198 remains a "0" bit supplied to the OR-gate 200. Therefore, the input to the amplifier 206 from the OR-gate 200 is a series of "1" bits and "0" corresponding to the output of the OR-gate 192 in the proportional control signal generator 56. The amplifier 206 periodically energizes and deenergizes the solenoid 208 in response to the output of the OR-gate 200. As can be seen, the vacuum input through the conduit 212 and the atmospheric input through the conduit 214 are modulated to control the degree of vacuum within the mixing chamber 210 as a function of the output of the proportional control signal generator 56. Therefore, the vehicle throttle 226 is positioned by the movement of the diaphragm 222 against the return force of the spring 224 to an intermediate position corresponding to the vehicle in-zone speed error to provide for proportional control between maximum deceleration and maximum acceleration. The delay times $Y_3$ through $Y_9$ of the respective time delay circuits 148 through 160 are chosen so as to provide the desired degree of deceleration or acceleration as a function of the in-zone speed error.

When the speed of the vehicle is overspeed out-of-zone, the input through the line 48 to the inverter 202 in the output logic circuit 30 shifts from a "1" bit to a "0" bit during the "1" bit pulse 98 supplied to the AND-gate 194 through the line 38. The output of the inverter 202 then shifts to a "1" bit. Therefore, the output of the AND-gate 194 shifts from a "0" bit to a "1" bit which is supplied to the inverter 196 whose output shifts from a "1" bit to a "0" bit. This transition triggers the flip-flop 198 whose 1 output shifts to a "1" bit which is supplied to the OR-gate 200. Therefore, the OR-gate 200 continuously supplies a "1" bit to the amplifier 206 which continuously energizes the solenoid 208 to move the valve member 216 against the return force of the spring 218 to close the vacuum inlet through the conduit 212 and admit atmospheric air through the conduit 214. The diaphragm 222 is therefore moved by the spring 224 to permit the vehicle throttle 226 to close to provide for maximum deceleration.

Upon the occurrence of the next "1" bit pulse 96 at the output of the clock 58 in FIG. 2, the foregoing sequence of events will repeat and the vehicle speed will be controlled until the vehicle operator positions the switch 80 in FIG. 2 to the broken line position 88 to clear the memory register 12.

The foregoing description provides for proportional control while the vehicle speed is in-zone by suppressing four pulses in the suppressor 18 for illustration purposes only. As can be seen, the precision of the proportional control can be enhanced by additionally utilizing yet higher ordered flip-flops in the suppressor 18 and in the in-zone error indicator 26 for in-zone control with additional stages in the proportional control signal generator 56.

Another embodiment of the present invention includes the suppressing of the number of pulses supplied to the memory register. The number of pulses supplied during the clock pulse are counted by the tracking register until the number counted by the tracking register equals the number within the memory register. The remaining number of pulses occurring during the clock pulse are counted by the in-zone error indicator. If the vehicle speed is in-zone, the number of pulses counted by the in-zone error indicator represents the in-zone speed error. This number is utilized as previously described to control the vehicle speed in a manner proportional to the in-zone speed error.

What has been described is a proportional control digital speed control system in which the magnitude of the error in the speed of a controlled apparatus is determined when the error is within a predetermined magnitude and the speed of the controlled apparatus is controlled in a manner proportional to the speed error detected.

What is claimed is:

1. A device for determining the speed error of a moving apparatus with respect to a desired speed when the speed error is within a predetermined magnitude comprising, in combination, a first register for counting pulses supplied thereto; a second register for counting pulses supplied thereto, one of said registers including means for offsetting the number of pulses counted thereby with respect to the number of pulses supplied thereto by a number related to the predetermined magnitude; means for supplying a number of pulses representing the desired speed to the first register; means for supplying a number of pulses representing the actual speed to the second register; a third register for counting pulses supplied thereto; and circuit means coupled to the last-mentioned means and the first and second registers for supplying to the third register a number of pulses equal to the difference between the number of pulses counted by the first and second registers, the number of pulses counted by the third register being a coded representation of the magnitude and sign of the speed error.

2. A device for determining the speed error of a moving apparatus with respect to a desired speed when the speed error is within a predetermined magnitude comprising, in combination, a first register for counting pulses supplied thereto; a second register for counting pulses supplied thereto, the last-mentioned register including a suppressor for decreasing the number of pulses counted thereby in relation to the number of pulses supplied thereto by a predetermined number related to the predetermined magnitude; means for supplying a number of pulses representing the desired speed to the first register; means for supplying a number of pulses representing the actual speed to the second register; a third register for counting pulses supplied thereto; and circuit means for supplying pulses simultaneously to the second and third registers after the number of pulses representing the actual speed have been supplied to the second register until the number of pulses counted by the second register equals the number of pulses counted by the first register, the number of pulses counted by the third register being a coded representation of the magnitude and sign of the speed error.

3. A digital speed control system for proportionally controlling the speed of a controlled apparatus when the speed error is within a predetermined magnitude comprising, in combination, a first digital register; means for stepping the first digital register so as to generate therein a binary number representing the desired speed of the controlled apparatus; a second digital register; means for periodically stepping and clearing the second digital register so as to periodically generate therein a binary number representing a speed less than the actual speed of the controlled apparatus, the difference between the speed represented and the actual speed being related to the predetermined magnitude; means for determining the speed error after the binary number has been generated within the second digital register and when the speed error is within the predetermined magnitude, the means for determining the speed error including a third digital register and means for stepping the second and third digital registers simultaneously until the binary number generated within the second digital register equals the binary number generated within the first digital register, whereby the binary number generated within the third digital register is related to the speed error within the predetermined magnitude; and means responsive to the binary number generated within the third digital register for controlling the speed of the controlled apparatus in a proportional relationship to the binary number generated within the third digital register.

4. A digital speed control system for proportionally controlling the speed of a controlled apparatus when the speed error is within a predetermined magnitude comprising, in combination, a first digital register; means for stepping the first digital register so as to generate therein a number representing the desired speed of the controlled apparatus; a second digital register; means for periodically stepping and clearing the second digital register so as to periodically generate therein a number representing a speed less than the actual speed of the controlled apparatus, the difference between the speed represented and the actual speed being equal to a number representing the predetermined magnitude plus one; means for determining the speed error after the number has been generated within the second digital register and when the speed error is within the predetermined magnitude, the means for determining the speed error including a third digital register and means for stepping the second and third digital registers simultaneously until the number generated within the second digital register equals the number generated within the first digital register, whereby the speed error equals the number representing the predetermined magnitude plus one less the number generated within the third digital register; and means responsive to the number generated within the third digital register for controlling the speed of the controlled apparatus in a proportional relationship to the speed error.

5. The method of determining the speed error of a moving apparatus with respect to a desired speed when the speed error is within a predetermined magnitude including the steps of generating within a first digital register a number representing the desired speed, generating within a second digital register a number equal to a number which represents the actual speed less a number which represents the predetermined magnitude, stepping the second digital register and a third digital register simultaneously until the number within the second digital register equals the number within the third digital register whereby the number generated within the third digital register represents the speed error of the moving apparatus with respect to the desired speed.

* * * * *